Figure 3:
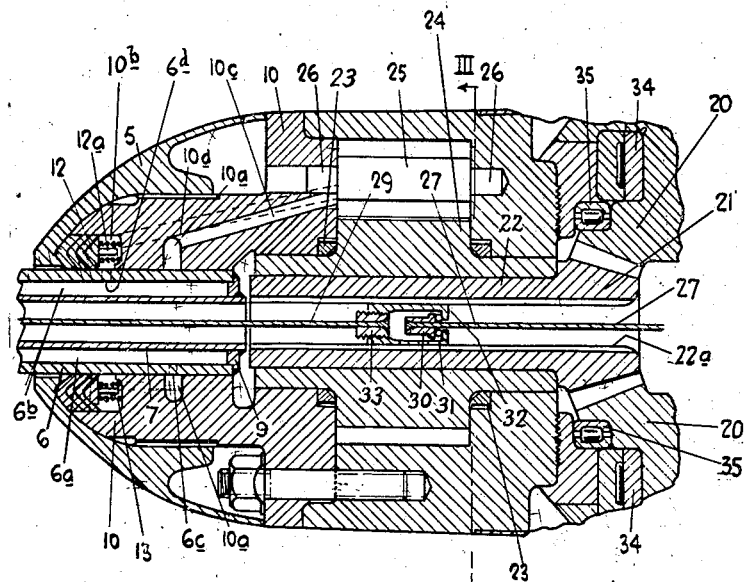

June 10, 1947.  P. W. SEEWER  2,422,138
SWIVELLING BLADED ADJUSTABLE PITCH PROPELLER
Filed Sept. 13, 1945   2 Sheets-Sheet 1
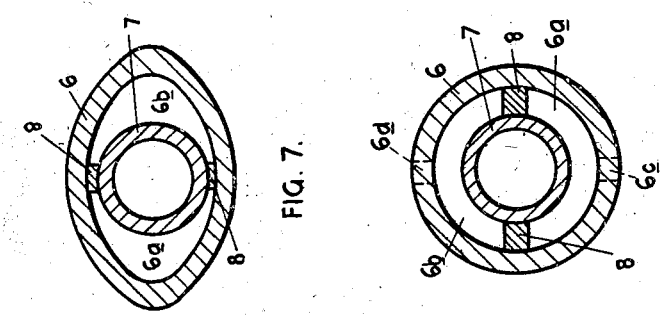
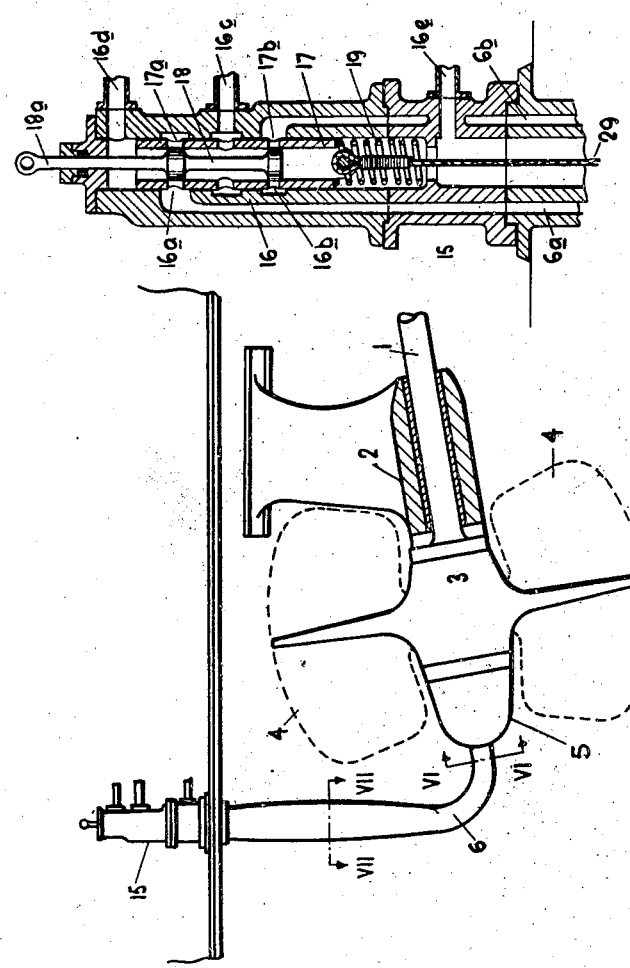
INVENTOR:
PAUL W. SEEWER.
BY Babcock & Babcock
ATTORNEYS June 10, 1947. P. W. SEEWER 2,422,138
SWIVELLING BLADED ADJUSTABLE PITCH PROPELLER
Filed Sept. 13, 1945 2 Sheets-Sheet 2

Inventor:
Paul W. Seewer
By Babcock & Babcock
Attorneys

Patented June 10, 1947

2,422,138

UNITED STATES PATENT OFFICE 2,422,138

SWIVELLING BLADED ADJUSTABLE PITCH PROPELLER

Paul Werner Seewer, Rugby, England, assignor to The English Electric Company Limited, London, England, a British company Application September 13, 1945, Serial No. 615,952
In Great Britain November 19, 1943

2 Claims. (Cl. 170—163)

This invention relates to a swivelling bladed variable pitch propeller and although of general application is particularly applicable to marine propellers.

One object of the invention is to provide a propeller of this kind having blade swivelling mechanism which can overcome the very considerable forces which may act on the blades of a variable pitch marine propeller, which propeller can, however, be added to existing equipment or incorporated in an existing design (intended for an invariable propeller) without necessitating an increase of diameter or other alteration to the propeller shaft and its bearings. Hitherto swivelling bladed propellers have usually needed hollow propeller shafts through which to make connection to the blade swivelling mechanism or to the servo-motor therefor; the present invention provides an improved propeller construction suitable for mounting on a solid shaft and with blade swivelling mechanism which can be entirely independent of the shaft bearings.

According to the invention the necessary connection for actuating and controlling the blade swivelling mechanism is made to the propeller, not through the length of the propeller shaft or through a bearing therefor, but through a separate arrangement comprising one or more tubular members in communication with the inside of the rotating propeller hub; preferably this member is a pipe going to a fluid-pressure servo-motor in the hub and preferably furthermore a streamlined member lying beyond the propeller and communicating with the hub axially at the nose of the propeller, i. e. at the outer end of the hub beyond the propeller shaft and its bearings. In a preferred form of the invention a fluid pressure servo-motor for swivelling the blades is mounted in the unsupported nose of the hub beyond the blades (i. e. the blades are between the outer shaft bearing and the servo-motor) and fluid under pressure is supplied through pipe connections going axially into the propeller nose from one or more tubular members adjacent to the nose and of streamlined cross section.

According to a further feature, the servo-motor is of the kind which is substantially rigidly held in position by the operating fluid when the control valve for this fluid is in the neutral position in order to stop the swivelling motion of the blades.

A convenient form of hydraulic servo-motor for the purpose is of the gear wheel type known for use both as a hydraulic pump and as a hydraulic motor.

Figure 4:
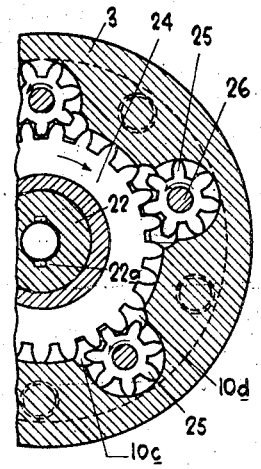
Figure 5:
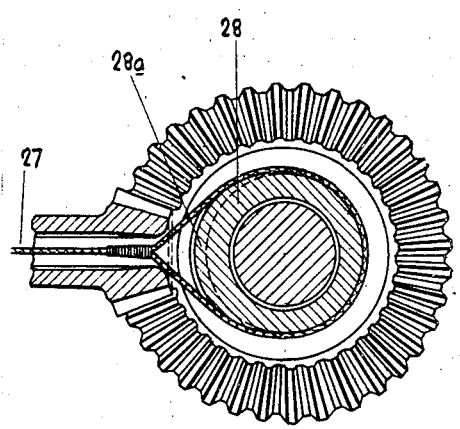
Figure 2:
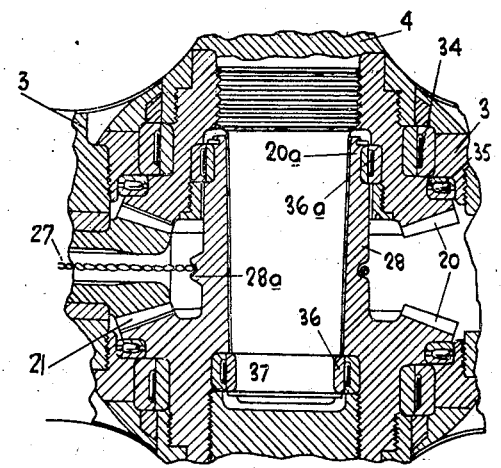

A marine propeller arrangement according to the invention is shown in the accompanying drawings of which Fig. 1 is an external view of the propeller with its bearing and the tubular member, Fig. 2 is an enlarged view partly in axial section to show the blade bearings, Fig. 3 is a view to a still larger scale, and in axial section, of the propeller nose, Fig. 4 is a part cross section through the servo-motor on the line IV—IV of Fig. 2, Fig. 5 is a part axial section looking end on to a blade spindle, while Figs. 6 and 7 are cross sections (on VI—VI and VII—VII of Fig. 1) through the streamlined tubular member and Fig. 8 is an enlarged section through a typical form of control valve.

In Fig. 1 the propeller shaft 1 passes from the vessel through the bearing 2 into the hub of the propeller 3 which is secured to the shaft 1 and has swivelling blades 4. As shown in Fig. 2, each of the blades 4 is secured to a bevel wheel 20, each carried in a needle roller bearing 34 in the propeller hub 3 immediately adjacent to each blade. The outward force on each blade is taken by the roller thrust bearing 35 behind each bevel wheel 20. Inside each bevel wheel and immediately adjacent to each bearing 34 is another needle roller bearing 36. One of these is a bearing for an extension 20a from the bevel wheel secured to one of the blades while the other is a bearing for a spindle 37 secured to the other blade.

Inside the hub, between the blades 4 and the nose cap 5, is a fluid-pressure servo-motor connected to the blade swivelling mechanism, as in Fig. 3. The blades 4 are operated in known manner by bevel gearing, comprising the previously mentioned bevel wheels 20—preferably helically toothed—meshing with a driving bevel pinion 21 formed on the end of an actuating shaft 22 co-axial with the propeller. Mounted on this actuating shaft is a gear wheel 24 serving as one of the rotors of the hydraulic servo-motor. Meshing with wheel 24 is at least one spur pinion 25 carried in bearings 26 within the nose-body 10 and the hub 3 or usually and preferably a ring of such pinions 25 disposed around the wheel 24 as in Fig. 4. The nose 10 and the hub 3 besides providing bearings for these wheels 24 and 25 enclose the whole of this gear arrangement in a closed watertight casing. Packing rings 23 within the nose-body 10 and hub 3 surround the spindle integral with wheel 24. A duct or ducts 10c is provided through the nose-body 10 up to a point on each pinion 25 where a tooth thereon is just about to come into mesh with a tooth of the wheel 24; in Fig. 4 these ducts 10c will be seen opening into the space to one side of each pinion 25 between two teeth of the wheel 24 into which space a tooth of the pinion is entering. A similar duct 10d can be seen extending through the casing similarly located on the opposite side of each pinion.

Duct 10c communicates with annular opening 10a and duct 10d communicates with annular opening 10b within the nose-body 10 around the propeller axis close to the end of the nose. Fluid under pressure is introduced into the propeller nose by a partly streamlined hollow arm 6 (Fig. 1) carried at its lower end by the nose and reaching up through the ship's hull into the interior of the vessel, this arm thus being, in the case of an astern propeller, between the propeller and the rudder.

As shown in Figs. 3, 6 and 7 the arm 6 contains an inner tube 7 spaced apart from the outer walls by the longitudinally extending barriers 8 dividing the space between inner and outer walls into two separate ducts 6a and 6b closed up by the closure disc 9. The space 6a communicates through hole or holes 6c with the annular space 10a and the space 6b through hole or holes 6d with the annular space 10b in the nose-body 10. The inner tube 7 can supply oil to the interior of the hub whereby the blade swiveling mechanism in the hub can be kept oil-immersed. The ducts 6a and 6b are connected to the usual control valve 15 aboard the vessel (see Figs. 1 and 8), this valve being movable to either side of the mid position to connect either end of the servo-motor to the fluid pressure supply and the other end to exhaust according to the direction in which it is desired to swivel the blades.

The control valve, which is shown in enlarged section in Fig. 8 for clearness, is of orthodox type comprising a cylinder body 16, a ported sleeve 17 slidable therein, a spring 19 urging the sleeve upwards, and a piston valve 18 slidable in the sleeve, the cord 29 from the propeller being fastened to the sleeve, and the piston valve being operable by the piston rod 18a. When the piston valve is moved downwards within the sleeve, it uncovers ports 17a and 17b in the sleeve; fluid under pressure from the supply pipe 16c can enter the space 6b through port 17b in the sleeve and port 16b in the body while space 6a is connected to the exhaust port 16d through the port 17a in the sleeve and the port 16a in the body. As a result, the servo-motor and blades are set in motion and the cord 29 pulls the sleeve 17 downwards until the ports 17a and 17b are again covered by the piston valve. Similarly when the piston valve is moved upwards, fluid under pressure from the supply pipe 16c can enter the space 6a through port 17a in the sleeve and port 16a in the body while space 6b is connected to the exhaust port 16e through the port 17b in the sleeve and the port 16b in the body. The servo-motor and blades are accordingly set in motion in the opposite direction from before and the cord 29 allows the sleeve 17 to be moved upwards by the spring 19 until the ports 17a and 17b are again covered by the piston valve. This valve device forms no part of the invention and is merely the usual valve by which variable pitch propellers are controlled.

Fluid pressure, when applied through the set of ducts 10c will act on certain teeth, as in Fig. 3, of the wheel 24 and each pinion 25 while the fluid adjacent to teeth displaced a little way around the wheel 24 will be connected to exhaust through duct 10d; the difference in pressure will accordingly rotate the wheel 24 and with it each pinion 25 in the direction of the arrow in Fig. 4, the motion of the teeth intermeshed with each other serving to close up spaces between the teeth in which fluid is trapped and conveyed from the pressure side to the exhaust side. When fluid pressure is applied through ducts 10d and ducts 10c are connected to exhaust the wheel 24 will rotate in the reverse direction.

The return motion extending through pipe 7 in order to operate the valve sleeve 17 mechanically in the usual manner is afforded by a cable 27 forming a loop around the eccentric 28a on the blade spindle 28 shown in Figs. 2 and 5, and extending axially through the nose to a swivel joint with the cable 29 which extends centrally through tube 7. The swivel joint (Fig. 3) comprises the flanged thimble 30 fastened on the end of cable 27, the shouldered sleeve 31, the thrust bearing 32 between the flange of thimble 30 and the shoulder of sleeve 31 and the plug 33 fixed in the end of sleeve 31 and fastened on the end of cable 29. The cable 29 is, of course, kept taut by the spring 19 on the valve 15 (Fig. 8).

The described form of servo-motor has the advantage that, if the reaction on the blades 4 tends to swivel them and drive the motor, the latter can be held stationary by the application of sufficient fluid pressure thereto. Through the cable 29 connected to the usual follow-up device constituted by the sleeve 17 of the control valve 15, movement of the blades 4 after the valve 15 has been closed will reopen the valve to apply the pressure necessary to prevent further movement of the blades.

It is possible if desired to give the blades an angular motion of 180° without requiring undue space and hence an unduly large and in particular unduly long propeller hub.

Since the arm 6 is stationary, while the propeller is rotating, the lower end of the arm, which end is cylindrical, enters the nose of the propeller axially and engages therewith through a running joint including the necessary stuffing box. This is formed by the V section annular washers 11 of packing material (Fig. 3) embracing the externally circular part of arm 6 and held by the nose cap 5 in a recess in the nose-body 10 against the force of ring 12 which is urged outwards by springs 13 around pegs 12a projecting from the ring 12. As will be seen from Figs. 6 and 7 the cross-section of the arm progressively changes from a circular to a streamlined section.

What I claim as my invention and desire to secure by Letters Patent is:

1. In combination, a variable pitch propeller incorporating a propeller hub, swivelling blades thereon, a rotary gear wheel type fluid pressure servo-motor within said hub in driving connection with said swivelling blades, a stationary tubular member communicating with the interior of said rotary hub and in fluid supply connection with said servo-motor without forming a supporting bearing for said hub, a control valve outside the propeller connected to said tubular member, a follow-up member within said valve, an eccentric connected with one of the said swivelling blades, a follower engaging said eccentric, and a mechanically operative connection extending from the said follower through said tubular member to said follow-up member within the valve the said connection being adapted, subsequently to an adjustment of the said blades by the said servo-motor, to restore the said follow-up member to a position relative to the said control valve in which the latter disconnects the servomotor from the fluid pressure tending to continue said adjustment of the blades.

2. In combination, a variable pitch propeller incorporating a propeller hub, a pair of diametrically opposite swivelling blades thereon, hollow blade spindles secured to said blades and extending into said hub, a bearing within said hub around each of said spindles immediately adjacent to the blade, a bearing within each of said spindles adjacent to the blade and embracing the end of an extension from the spindle of the opposite blade, a fluid pressure servo-motor within said hub in driving connection with said blade spindles, a stationary fluid supply pipe to said servo-motor not forming a supporting bearing for said hub, a control valve outside the propeller connected to the said stationary fluid supply pipe, a follow-up member within said valve, an eccentric on one of the said blade spindles a follower engaging said eccentric, and a mechanically operative connection extending through the said fluid pipe between the said follower and the said follow-up member within the valve, the said connection being adapted subsequently to an adjustment of the said blades by the said servomotor, to restore the said follow-up member to a position relative to the said control valve in which the latter disconnects the servomotor from the fluid pressure tending to continue the said adjustment of the blades.

PAUL WERNER SEEWER.

REFERENCES CITED

The following references are of record in the file of this patent:

UNITED STATES PATENTS

| Number | Name | Date |
|---|---|---|
| 1,987,651 | Wiegand | Jan. 15, 1935 |
| 2,202,813 | Gausmann | June 4, 1940 |
| 2,313,795 | Algarsson | Mar. 16, 1943 |
| 2,357,228 | Seewer | Aug. 29, 1944 |
| 2,357,914 | Stepanoff | Sept. 12, 1944 |
| 2,403,532 | Hoover | July 9, 1946 |

FOREIGN PATENTS

| Number | Country | Date |
|---|---|---|
| 127,659 | Austria | Dec. 15, 1931 |